United States Patent [19]
Zittel

[11] Patent Number: 5,341,729
[45] Date of Patent: Aug. 30, 1994

[54] DISCHARGE FOR ROTATING DRUM BLANCHERS AND COOLERS

[75] Inventor: David R. Zittel, Columbus, Wis.

[73] Assignee: Lyco Manufacturing, Inc., Columbus, Wis.

[21] Appl. No.: 126,037

[22] Filed: Sep. 23, 1993

[51] Int. Cl.⁵ .................. A23L 3/00; A23N 12/00; A47J 37/12; F25D 25/02
[52] U.S. Cl. ........................... 99/348; 99/404; 99/409; 99/443 C; 134/65; 134/132; 366/81; 366/234; 366/319
[58] Field of Search ............... 99/352, 355, 348, 360, 99/365, 404, 403, 409, 450, 470, 483, 487, 516, 517, 534, 536, 477–479, 443 R, 443 C; 366/81, 91, 101, 102, 234, 290, 318, 319, 322, 324; 134/65, 132; 62/381; 100/117, 145

[56] References Cited

U.S. PATENT DOCUMENTS

| Re. 23,887 | 10/1954 | Balluteen | 99/404 |
|---|---|---|---|
| 2,018,419 | 10/1935 | Richeson | 53/7 |
| 2,299,080 | 10/1942 | De Back | 146/219 |
| 2,505,371 | 4/1950 | Teepe | 51/164 |
| 2,585,293 | 2/1952 | Ashton | 99/404 |
| 2,732,789 | 1/1956 | Herberg | 99/404 |
| 3,086,444 | 4/1963 | De Back | 99/239 |
| 3,924,839 | 12/1975 | Millauer | 366/319 X |
| 4,092,015 | 5/1978 | Koch | 366/81 |
| 4,627,735 | 12/1986 | Rose et al. | 366/81 |
| 4,688,476 | 8/1987 | Zittel | 99/403 |
| 4,733,607 | 3/1988 | Star et al. | 99/348 |
| 4,875,344 | 10/1989 | Zittel | 62/381 |
| 4,906,104 | 3/1990 | Nishise et al. | 366/322 |
| 4,942,810 | 7/1990 | Zittel et al. | 99/477 |
| 4,980,724 | 12/1990 | Tanaka | 366/319 |
| 5,133,249 | 7/1992 | Zittel | 99/348 |
| 5,146,841 | 9/1992 | Zittel | 99/348 |

OTHER PUBLICATIONS

Continuous Rotary Drum Cooler, Lyco Manufacturing, Inc., Columbus, Wis., undated.

*Primary Examiner*—Timothy F. Simone
*Attorney, Agent, or Firm*—Lathrop & Clark

[57] ABSTRACT

A discharge chute extends between an auger and the discharge end plate of a perforated cylinder which rotates within a water-filled tank in a food processing apparatus such as a blancher or a cooler. The chute is fixed to the cylinder to rotate with the cylinder and has an inlet within the cylinder and an outlet which communicates with the exterior of the apparatus. A lifting flight extends between the perforated side wall of the cylinder and the discharge chute and is fixed to the discharge chute, such that food product advanced to the discharge end of the tank by an auger fixed to the cylinder, is engaged by the lifting flight and elevated to discharge into the chute discharge opening and then along an inclined surface within the chute to be discharged from the apparatus. The discharge assembly thus avoids any pinching of food product between rotating and nonrotating parts of the apparatus. Food product contained in pouches is protected from rupture at the discharge.

9 Claims, 3 Drawing Sheets

DISCHARGE FOR ROTATING DRUM BLANCHERS AND COOLERS

FIELD OF THE INVENTION

This invention relates to apparatus for processing food in general, and to a discharge for rotating auger-advanced food heating and cooling apparatus in particular.

BACKGROUND OF THE INVENTION

Rotary drum food processing apparatus such as rotating drum cookers, blanchers, and coolers, are used where it is desired to treat a constant flow of food product over time. Typically, such equipment employs a helical auger fixed to a cylindrical drum having a perforated outer skin. The drum is mounted within a water tank, usually covered, and is rotated at the speed required to achieve a desired residence time of the food product within the water tank. The perforated skin of the drum contains the food product while allowing the water bath to fill the lower regions of the drum and support and exchange heat with the food product.

Food product is introduced into the rotating drum through an inclined inlet chute or ramp. The entry of the food product into the tank is cushioned somewhat by the water bath. Once within the tank the food product is gently advanced by the motion of the helical auger. Once the food product has traversed the tank, however, it must be elevated above the water level to be discharged from the tank. Granular or particulate food product or food product which is not susceptible to tearing or rupture may be elevated employing a series of rotating lifting flights which continuously lift the food product and discharge it into a chute which remains fixed with respect to the rotating drum.

Food product which is sensitive to damage or food product contained within flexible plastic membrane pouches, must be handled differently to avoid catching or pinching of the product between the fixed chute and the rotating flights. One approach which has been successfully employed for handling pouched food product is to extend outwardly the tank from the drum to provide space for an inclined conveyor belt to extend from the very lowest portion of the tank to a level above the water level. Although such a discharge assembly provides satisfactory performance in handling delicate product, the additional volume required for the inclined conveyor requires additional floor space, and the mechanical complexity of the inclined conveyor represents a significant additional cost to the apparatus.

What is needed is a discharge for a rotating drum food processing apparatus which can economically handle sensitive or pouched food product without damage.

SUMMARY OF THE INVENTION

The discharge assembly of the present invention forms a part of a rotating drum food processing apparatus such as a blancher or a cooler. The discharge eliminates any contact between rotating and nonrotating parts at the outlet from the apparatus and thus avoids possible pinching of delicate food product or pouched food product.

A discharge chute extends between an auger and the discharge end plate of a perforated cylinder which rotates within a water-filled tank in the food processing apparatus. The chute is fixed to the cylinder to rotate with the cylinder and has an inlet within the cylinder and an outlet which communicates with the exterior of the apparatus. A lifting flight extends between the perforated side wall of the cylinder and the discharge chute and is fixed to the discharge chute, such that food product is advanced to the discharge end of the tank by an auger fixed to the cylinder, is engaged by the lifting flight and elevated to discharge into the chute discharge opening and then along an inclined surface within the chute to be discharged from the apparatus. The discharge assembly thus avoids any pinching of food product between rotating and nonrotating parts of the apparatus.

It is an object of the present invention to provide a discharge for a rotating drum food processing apparatus which does not pinch or rupture pouched food product.

It is a further object of the present invention to provide a rotating drum food processing apparatus which processes food product with a low incidence of damage.

It is yet another object of the present invention to provide a discharge for a rotating drum food processing apparatus which avoids contact of the food product between rotating and nonrotating parts.

Further objects, features, and advantages of the invention will be apparent from the following detailed description when taken in conjunction with the accompanying drawings.

DESCRIPTION OF THE PREFERRED EMBODIMENT

Figure 1:
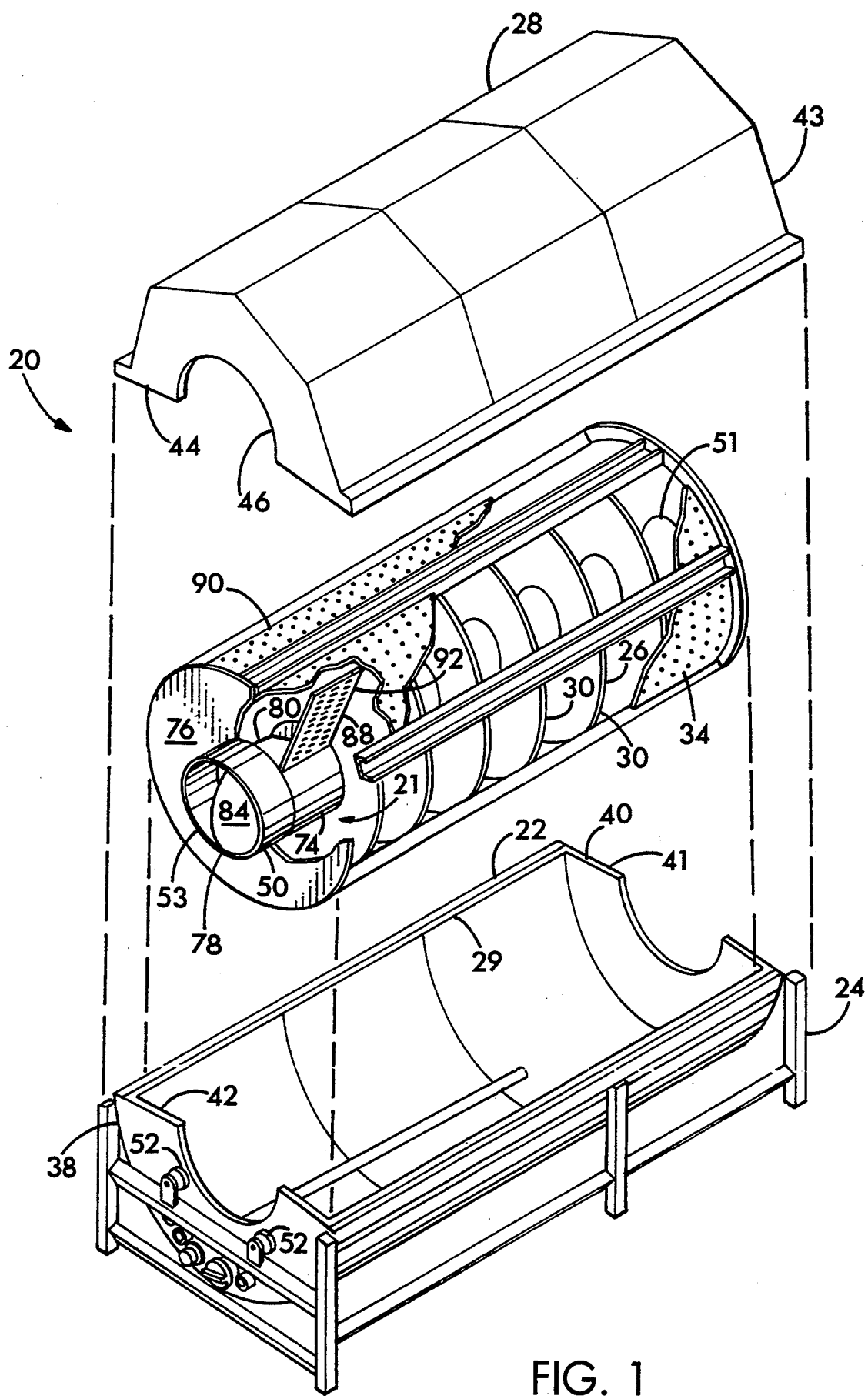
FIG. 1 is an exploded isometric view, partly broken away, of the discharge of this invention incorporated within a rotating drum cooler.

Referring more particularly to FIGS. 1-9 wherein like numbers refer to similar parts, a rotating drum food treating apparatus 20 is shown in FIG. 1. The discharge 21 of this invention is installed within the apparatus 20 to discharge food product once it has been treated. The apparatus 20 has an elongated open top tank 22 which is supported by a frame 24. An auger 26 within a perforated cylinder 34 is longitudinally mounted within the tank 22 and an elongated vaulted cover 28 fits over and covers the tank 22. The tank has a semi-cylindrical wall 29 with drains located at its lowest portion. The exemplary apparatus 20 may be supplied with chilled water to serve as a cooler. However, it should be noted that the apparatus may be supplied with heated water or steam heat to serve as a blancher.

The auger 26 is rotatably mounted within the tank 22 and has stainless steel flights 30. A perforated cylinder 34 encloses the auger 26 and is formed of a plurality of perforated screens. The perforated cylinder 34 contains the food product 36 being conveyed by the auger 26. The cylinder 34 and auger 26 are driven by a motor (not shown) at a rate selected to achieve the desired residence of the food product within the apparatus 20.

As the auger 26 rotates, its flights 30 move the food product 36 being treated from the inlet end 40 to the discharge end 38 of the tank 22. The end walls 41, 42 of the tank and the end walls 43, 44 of the cover 28 form holes 46 through which the tube journals 50 extend. The tube journals 50 also define the inlet opening 51 and outlet opening 53 of the cylinder 34. The tube journals 50 and the cylinder 34 and connected auger 26 are supported at both ends of the tank 22 by trunions 52 which are mounted to the frame 24 to support the journals 50 in a conventional manner such that the journals 50 do not make contact with the walls 41, 42, 43, 44 of the tank 22 or cover 28. The vaulted cover 28 may be hingedly attached to the tank 22 so that it may be opened from either side of the apparatus as in the manner disclosed in U.S. Pat. No. 4,788,476 to Zittel, the disclosure of which is hereby incorporated herein by reference, or the cover 28 may be attached to the tank 22 in any conventional manner.

The stainless steel flights 30 of the auger 26 extend helically toward the discharge end 38 of the apparatus 20 such that when the auger 26 is rotated in a clockwise direction, the food product contained within the cylinder 34 is propelled by the auger flights 30 toward the discharge end 38.

In certain applications, particularly where it is desired to treat liquid or semiliquid food product, for example soup, or catsup, the food product is packaged within plastic bags or pouches 54. Each pouch is typically formed of a plastic membrane which is sealed with a clip at each end. A pouch may be as small as one inch long, or over a foot in length, depending on the volume to be contained therein. Food product within a pouch 54 is particularly susceptible to being discharged from the pouch through a rupture in the plastic membrane. All sharp edges of the apparatus 20 must be kept from contact with the pouches 54. Furthermore, possible pinch points between fixed and rotating portions of the apparatus 20 must be avoided. Ruptured pouches of food product are undesirable not only because of the destruction and waste of food product, but also because the spilled food product will require additional or more frequent downing of the apparatus for cleaning.

Figure 2:
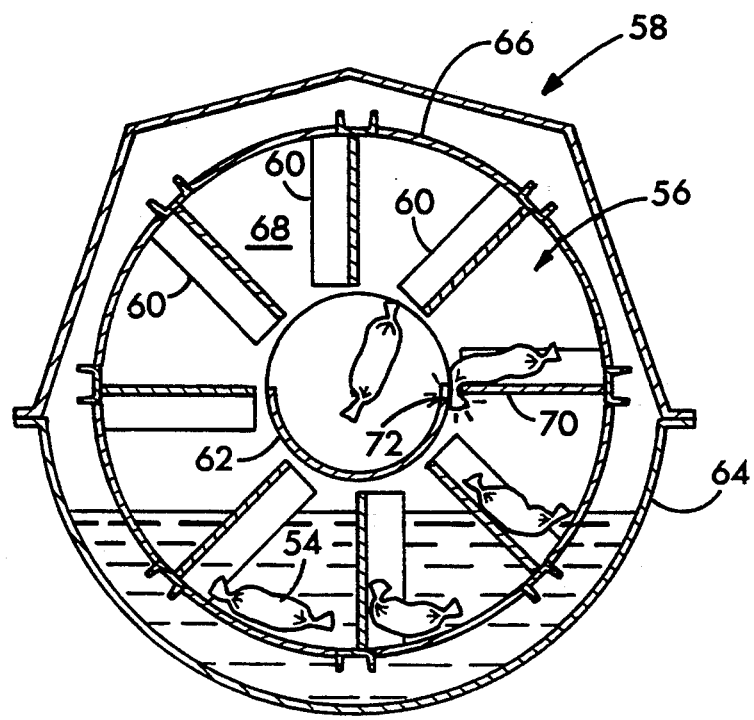
FIG. 2 is a cross-sectional view of a prior art cooler discharge.

The efficacy of the discharge 21 of the present invention is best appreciated in comparison to a prior art discharge 56 within a prior art food treatment apparatus 58 shown in FIG. 2. The prior art apparatus 58 is substantially similar to the apparatus 20 described above, with the exception that it is provided with a discharge assembly 56 having eight lifting buckets or flights 60 which are fixed to the perforated cylinder 66 and a semi-cylindrical discharge chute 62 which is fixed to the tank 64 and remains in place as the perforated cylinder 66 and connected auger 68 rotate.

Each lifting flight 60 of the prior art discharge 56 has a perforated base plate 70 which rotates with the cylinder 66 and engages against a pouch 54 within the water in the tank, lifts the pouch from the water, and drops the pouch into the fixed chute 62. Although this discharge 56 functions acceptably for granular or unitary food products, a pinch point 72 is presented between the fixed chute and each rotating lifting flight plate 70. The lifting flight plate 70 travels in closely spaced relation to the cylindrical exterior of the discharge chute as the cylinder 66 rotates. As the pouch 54 slides down the plate 70 there is the possibility that a portion of the flexible pouch membrane will be caught at the pinch point 72 between the lifting flight 60 and the chute 62 and the pouch will be ruptured.

Figure 3:
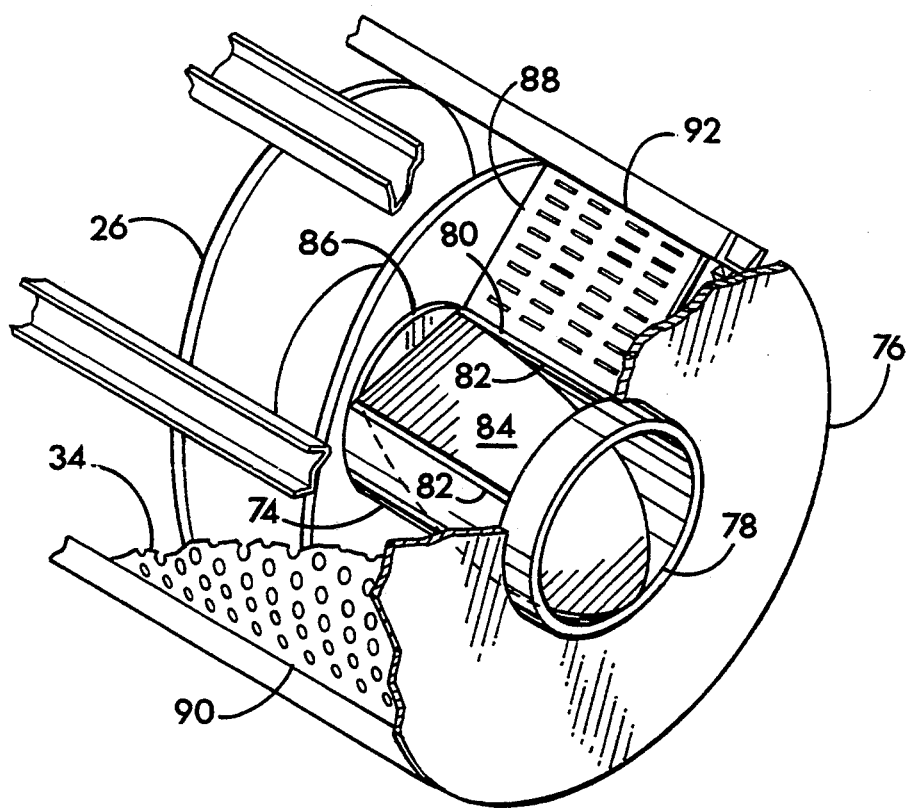
FIG. 3 is an isometric view, partly broken away, of a rotating drum for a blancher or cooler incorporating the discharge of this invention.

The discharge 21 of the present invention, as shown in FIG. 3, avoids possible pinch points by eliminating contact between fixed and rotating parts of the apparatus. The discharge 21 has a chute 74 which is preferably semi-cylindrical and which is fixed to the cylinder 34 to rotate with the cylinder. The chute 74 extends between the auger 26 and the discharge end plate 76 of the cylinder 34. The chute 74 is preferably fixed by welding to both the auger 26 and the discharge end plate 76.

The chute 74 has a discharge opening 78 which communicates with the outlet opening 53 of the cylinder 34 in the discharge end plate 76 and which is of approximately the same internal diameter as the journal 50 at the discharge end 38 of the apparatus 20. The chute 74 has an inlet opening 80 which is within the cylinder 34 and which is defined by axially extending lips 82 of the chute which are located at approximately the same radial distance from the axis of the cylinder 34. The semicylindrical chute thus extends above the axis of the cylinder 34 to define the inlet opening 80.

The chute 74 preferably has an inclined surface 84 which is spaced opposite the chute inlet opening 80 and which is inclined radially outwardly toward the discharge end 38 of the apparatus to facilitate discharge of material deposited within the chute 74. The inclined surface extends from the rear wall 86 of the chute to the discharge opening 78. In a semi-cylindrical chute 74, the inclined surface may be formed by a generally elliptical plate with a straight rear edge welded within the chute.

The discharge 21 has a single lifting flight 88 which extends between the side wall 90 of the cylinder 34 and the chute 74. The lifting flight 88 has a perforated base plate 92 which is welded to one lip 82 of the chute along the chute inlet opening 80.

The operation of the discharge 21 is shown in FIGS. 4–9. Food product pouches 54 are continuously advanced through the water 94 within the tank 22 by the auger 26. When a pouch 54 has traversed the length of the apparatus 20 and reached the discharge end 38 of the apparatus it has resided within the tank 22 for a sufficient time to achieve the desired treatment.

Figure 4:
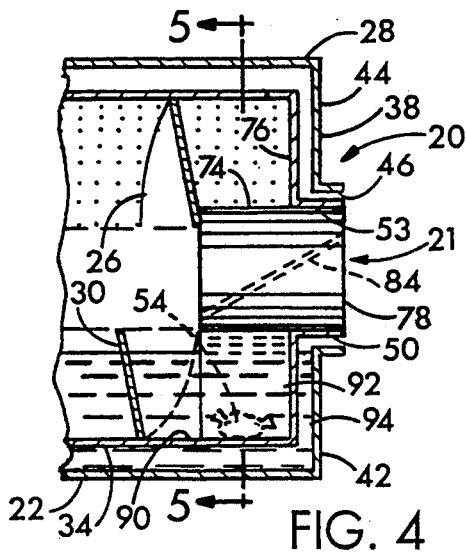
FIG. 4 is a cross-sectional view of the drum of FIG. 3 shown in place within a water-filled tank, with the lifting flight engaged against a pouch of food product.
Figure 5:
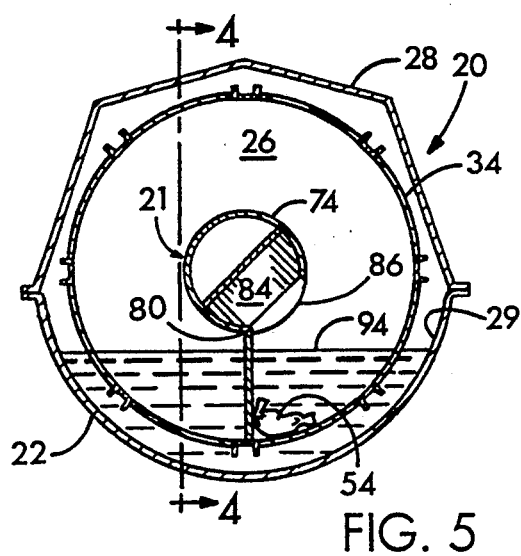
FIG. 5 is a cross-sectional view of the apparatus of FIG. 4, taken along section line 5—5.
Figure 8:
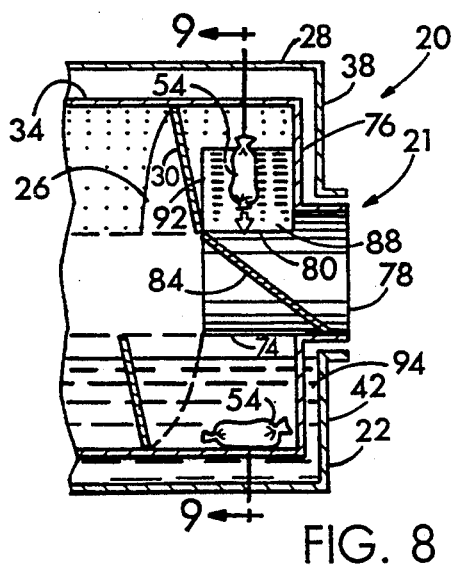
FIG. 8 is a cross-sectional view of the apparatus of FIG. 4 shown with the pouched food product being discharged into the chute.
Figure 9:
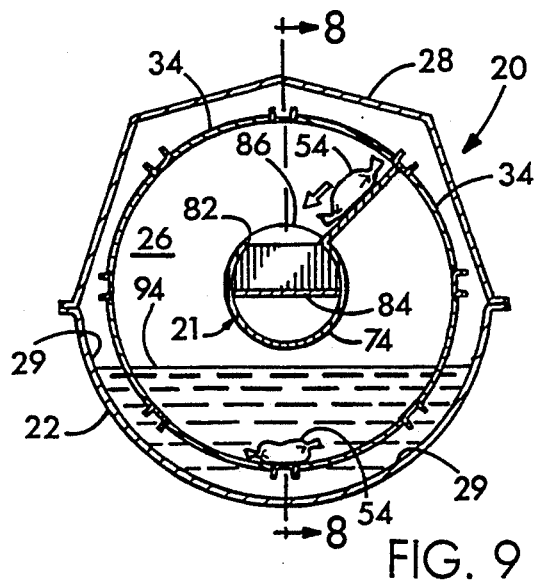
FIG. 9 is a cross-sectional view of the apparatus of FIG. 8 taken along section line 9—9.

Depending on the buoyancy of the food product 36 within the pouch 54, the pouch will rest against the perforated cylinder side wall 90 or will float suspended in the water 94 at the discharge end 38 of the apparatus 20. As shown in FIGS. 8 and 9, the deposited pouch 54 will generally reside at the discharge end of the tank 22 while the cylinder 34 rotates. Because there is minimal frictional engagement between the cylinder side wall 90 and the pouch, the pouch will not be displaced by this rotation. However, as shown in FIGS. 4 and 5, once the lifting flight 88 has rotated such that the lifting flight base plate 92 is in a generally vertical orientation and beneath the chute 74, the lifting flight 88 will engage the pouch 54 and begin to raise it from the water 94. It is important to note that the lifting flight 88 in coming into engagement with the pouch 54 does not rotate with respect to the cylinder 34 or the cylinder side wall 90. Because the lifting flight 88 is fixed to the chute 74 which is itself fixed to the cylinder 34 the discharge 21 rotates with the cylinder. It is the force of gravity which retains the pouch within the water, a force which is too great to be overcome by any frictional engagement between the pouch and the cylinder side wall. The lifting flight 88 provides an elevating platform which engages and elevates the pouch 54.

Figure 6:
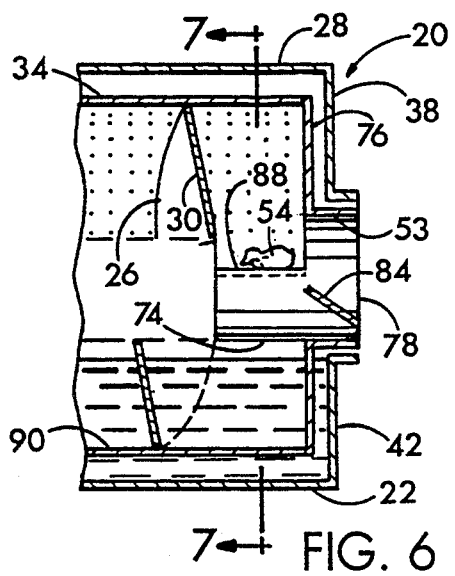
FIG. 6 is a cross-sectional view of the apparatus of FIG. 3 with the pouch elevated on the lifting flight.
Figure 7:
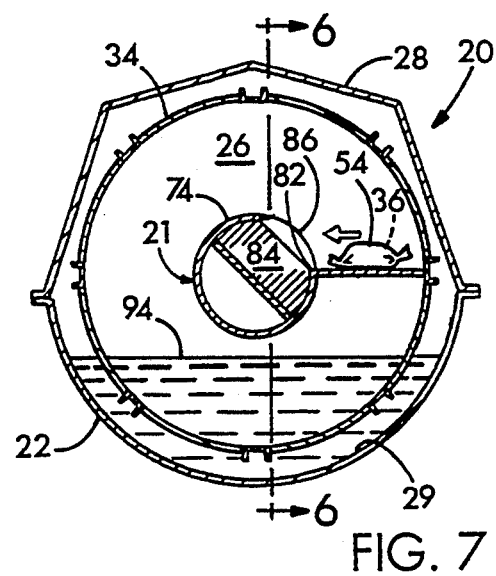
FIG. 7 is a cross-sectional view of the apparatus of FIG. 6 taken along section line 7—7.

As shown in FIGS. 6 and 7, the lifting flight 88 elevates the pouch 54 out of the water 94. The perforated base plate 92 of the flight 88 allows water to drain back into the tank 22 while retaining the pouch 54 in supportive relation. Should the pouch 54 be disposed against the cylinder side wall 90 while it is being elevated there is no danger of catching or rupturing the pouch as the flight 88 is welded to the side wall 90 in a fixed relation, providing no possibility of a pinch point.

As the lifting flight 88 continues to elevate the pouch 54, as shown in FIG. 9, the flight base plate 92 takes on a downward inclination. The pouch 54 rests on the base plate 92 until gravity causes the pouch to slide down the base plate 92, across the lip 82 and into the inlet opening 80 of the chute 74.

A pouch 54 which is received within the chute 74 will fall onto the inclined surface 84 of the chute and will thus be discharged out the outlet opening 53 of the cylinder 34 at a level above the level of the water 94. The pouch 54 may be discharged to a conveyor or to another food processing apparatus.

It should be noted that although the discharge 21 of the present invention is particularly effective in conveying pouched food product, it may also be employed with uncontained food product.

Furthermore, although shown incorporated within a cooler, the discharge assembly 21 may be successfully incorporated into a blancher or a cooker or other rotating food processing machinery. The discharge may be utilized in a rotating apparatus wherever it is desired to elevate food product, be it at the exit of the apparatus or at some position prior to the exit.

It is understood that the invention is not confined to the particular construction and arrangement of parts herein illustrated and described, but embraces all such modified forms thereof as come within the scope of the following claims.

I claim:

1. A food processing apparatus, comprising:
   a) a tank having an inlet end and a discharge end;
   b) a cylinder which has a perforated sidewall, the cylinder being mounted rotatably within the tank so that water contained in the tank will enter the cylinder, the cylinder having an inlet opening near the inlet end of the tank for receiving introduced food product and an outlet opening in a discharge end plate near the discharge end of the tank through which food product which has moved through the cylinder can be discharged from the tank;
   c) an auger positioned substantially within the cylinder to rotate with the cylinder, such that food product introduced into the cylinder is advanced by the auger from the inlet end to the discharge end of the tank;
   d) a discharge chute which extends between the auger and the discharge end plate and is fixed to the cylinder to rotate with the cylinder, wherein the discharge chute has a discharge opening which communicates with the discharge end plate outlet opening, and a chute inlet opening which is within the cylinder;
   e) a lifting flight which extends between the perforated side wall and the discharge chute and which is fixed to the discharge chute, such that food product advanced to the discharge end of the tank by the auger is engaged by the lifting flight and elevated to discharge into the chute discharge opening and then through the end plate outlet opening.

2. The apparatus of claim 1 wherein the discharge chute has an inclined surface spaced opposite the discharge chute inlet opening, the inclined surface being inclined radially outwardly and towards the outlet end of the tank to facilitate discharge of material deposited within the chute.

3. The apparatus of claim 1 wherein the chute inlet opening is formed by portions of the discharge chute which are semicylindrical.

4. In a food processing apparatus having a tank with an inlet end and a discharge end and a cylinder with a central axis which has a perforated sidewall and which is mounted rotatably within the tank, wherein the improvement comprises:
   a) a discharge chute which extends along the cylinder axis and is fixed to the cylinder to rotate with the cylinder, wherein the discharge chute has a discharge opening through which food product exits, and a chute inlet opening which is within the cylinder;
   b) a lifting flight which extends between the cylinder perforated side wall and the discharge chute and which is fixed to the discharge chute and is in fixed relation to the cylinder sidewall, wherein the lifting flight extends radially outwardly from the chute such that food product positioned in the cylinder beneath the chute is engaged by the lifting flight and elevated to discharge into the chute inlet opening and then through the chute discharge opening, the food product being thereby elevated.

5. The apparatus of claim 4 further comprising an inclined surface spaced opposite the discharge chute inlet opening, the inclined surface being inclined radially outwardly with respect to the cylinder axis, and wherein the surface extends towards the discharge opening to facilitate discharge of material deposited within the chute.

6. The apparatus of claim 4 wherein the discharge chute is semicylindrical.

7. The apparatus of claim 4 wherein the chute inlet opening is formed by portions of the discharge chute which are semicylindrical and which extend above the axis of the cylinder.

8. An assembly for positioning within a food processing apparatus having a tank with an inlet end and a discharge end and a cylinder with a central axis which has a perforated sidewall and which is mounted rotatably within the tank, the assembly comprising:
   a) a chute which is semicylindrical and which extends along the central axis and is fixed to the cylinder to rotate with the cylinder, wherein the chute has a radially extending discharge opening through which food product exits, and an axially extending chute inlet opening which is within the cylinder;
   b) a plate which extends between the cylinder perforated side wall and the chute and which is fixed to the chute and is fixed to the cylinder sidewall, wherein the plate extends radially outwardly from the chute such that food product positioned in the cylinder beneath the chute is engaged by the plate and elevated to discharge into the chute inlet opening and then through the chute discharge opening, the food product being thereby elevated.

9. The apparatus of claim 8 further comprising a second plate fixed to the chute within the chute, the plate passing through the cylinder axis and being inclined from the chute inlet opening to the chute discharge opening, to facilitate the exit of food product introduced into the chute.

* * * * *